United States Patent
Tang

(10) Patent No.: US 11,330,426 B2
(45) Date of Patent: May 10, 2022

(54) METHOD FOR REPORTING CAPABILITY, USER EQUIPMENT, AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/901,422

(22) Filed: Jun. 15, 2020

(65) Prior Publication Data

US 2020/0314633 A1    Oct. 1, 2020

Related U.S. Application Data

(63) Continuation of application No. PCT/CN2017/110916, filed on Nov. 14, 2017.

(51) Int. Cl.
*H04W 4/00* (2018.01)
*H04W 8/24* (2009.01)
*H04W 88/02* (2009.01)

(52) U.S. Cl.
CPC ............ *H04W 8/24* (2013.01); *H04W 88/02* (2013.01)

(58) Field of Classification Search
CPC ....... H04W 88/02; H04W 8/24; H04W 88/18; H04W 72/0413
See application file for complete search history.

(56) References Cited

U.S. PATENT DOCUMENTS

| 8,521,209 | B2 | 8/2013 | Kim | |
|---|---|---|---|---|
| 2011/0171989 | A1 | 7/2011 | Kim | |
| 2016/0174290 | A1 | 6/2016 | Cave et al. | |
| 2019/0141773 | A1* | 5/2019 | Kim | H04W 76/30 |
| 2019/0373452 | A1* | 12/2019 | Huang | H04W 24/10 |
| 2020/0260398 | A1* | 8/2020 | Jiang | H04W 80/02 |
| 2020/0280913 | A1* | 9/2020 | Chen | H04W 48/12 |
| 2020/0396654 | A1* | 12/2020 | Freda | H04W 36/06 |

FOREIGN PATENT DOCUMENTS

| CN | 101137184 A | 3/2008 |
|---|---|---|
| CN | 101370245 A | 2/2009 |
| CN | 101568059 A | 10/2009 |
| CN | 101605334 A | 12/2009 |

(Continued)

OTHER PUBLICATIONS

International Search Report in the international application No. PCT/CN2017/110916, dated Aug. 1, 2018.

(Continued)

*Primary Examiner* — Omoniyi Obayanju
(74) *Attorney, Agent, or Firm* — Perkins Coie LLP

(57) ABSTRACT

Provided is a method for reporting capability, user equipment, and a computer storage medium. The method includes: determining a support capability for a supplementary uplink (SUL) frequency; generating indication information of the support capability of UE for the SUL frequency based on the support capability for the SUL frequency; and reporting the indication information of the support capability for the SUL frequency to a network side.

9 Claims, 4 Drawing Sheets

(56) References Cited

FOREIGN PATENT DOCUMENTS

| CN | 102469568 A | 5/2012 |
|---|---|---|
| CN | 103313402 A | 9/2013 |
| CN | 104811411 A | 7/2015 |

OTHER PUBLICATIONS

English translation of the Written Opinion of the International Search Authority in the international application No. PCT/CN2017/110916, dated Aug. 1, 2018.
First Office Action of the Chinese application No. 201780052157.0, dated Dec. 12, 2019.
Notice of Allowance of the Chinese application No. 201780052157.0, dated Apr. 7, 2020.
CMCC: "Considerations on support of supplementary uplink frequency", 3GPP Draft; R2-1711824. Considerations on Support of Supplementary Uplink Frequency. 3rd Generation Partnership Project (3GPP), Mobile Competence Centre ; 650, Route Des Lucioles : F-06921 Sophia-Antip, vol. Ran WG2, no. Prague, Czech; Oct. 9, 2017-Oct. 13, 2017 Sep. 29, 2017 (Sep. 29, 2017), XP051355856. *p. 1-p. 6*.
Intel Corporation: "Email Disc on [99#25] [NR] Capability coordination—Part 1". 3GPP Draft; R2-1710632. 3rd Generation Partnership Project (3GPP), Mobile Competence Centre; 650, Route Des Lucioles: F-06921 Sophia-Antipolis Cedex: France vol. Ran WG2. no. Praque, Czech Republic Oct. 9, 2017-Oct. 13, 2017 Oct. 9, 2017 (Oct. 9, 2017), XP051355893. [retrieved on Oct. 9, 2017] *p. 1-p. 12*.
Apple: "Single UL transmission support for NR NSA mode UEs", 3GPP Draft; RP-171858, 3rd Generation Partnership Project (3GPP), Mobile Competence Centre; 650, Route Des Lucioles; F-06921 Sophia-Anti Polis Cedex; France vol. TSG RAN, no. Sapporo, Japan; Sep. 11, 2017-Sep. 14, 2017 Sep. 10, 2017 (Sep. 10, 2017), XP051324424. [retrieved on Sep. 10, 2017] *p. 1-p. 6*.
Supplementary European Search Report in the European application No. 17932514.7, dated Nov. 4, 2020.
Office Action of the Indian application No. 202017024829, dated Jul. 22, 2021. 5 pages with English translation.
CMCC: "WF on SUL band definition", 3GPP Draft; R4-1706966, vol. RAN WG4, no. Qingdao, China Jun. 27, 2017-Jun. 29, 2017 Jul. 7, 2017 (Jul. 7, 2017), XP051308749. 5 pages.
First Office Action of the European application No. 17932514.7, dated Jul. 30, 2021. 7 pages.
Second Office Action of the European application No. 17932514.7, dated Jan. 14, 2022. 6 pages.

\* cited by examiner

US 11,330,426 B2

METHOD FOR REPORTING CAPABILITY, USER EQUIPMENT, AND NETWORK DEVICE

CROSS-REFERENCE TO RELATED APPLICATION

This application is a continuation of International Patent Application No. PCT/CN2017/110916, filed on Nov. 14, 2017, the content of which is hereby incorporated in its entirety.

BACKGROUND

People demand more on rate, delay, high-speed mobility and energy efficiency, services in future life may become more diverse and complex, therefore, the 3rd generation partnership project (3GPP) international standards organization (ISO) starts the research and development of 5G, and then begins the deployment and research of NR. During early deployment of NR, it is difficult to obtain full NR coverage, so that typical network coverage is wide-area LTE coverage and lonely-island NR coverage. The motivation of introducing a supplementary uplink (SUL) frequency is to improve uplink coverage of a high frequency band of NR. However, how UE indicates its capability of supporting SUL to a network side is a problem to be solved.

SUMMARY

The disclosure relates to the technical field of communication processing, and more particularly to a method for reporting a capability, user equipment (UE), and a computer storage medium.

A method for reporting a capability according to a first aspect of the disclosure is applied to UE and may include that:
a support capability for an SUL frequency is determined;
indication information of the support capability of the UE for the SUL frequency is generated based on the support capability for the SUL frequency; and
the indication information of the support capability for the SUL frequency is reported to a network side.

A second aspect of the disclosure provides UE, which may include a processing unit and a communication unit.

The processing unit is configured to determine a support capability for a SUL frequency, and generate, based on the support capability for the SUL frequency, indication information of the support capability of the UE for the SUL frequency.

The communication unit is configured to report the indication information of the support capability for the SUL frequency to the network side.

A third aspect of the disclosure provides UE, which may include a processor and a memory configured to store a computer program capable of running in the processor.

The processor is configured to run the computer program to execute operations of the abovementioned method.

A fourth aspect of the disclosure also provides a computer storage medium. The computer storage medium has stored computer-executable instructions thereon. The computer-executable instructions, when being executed, may implement the operations of the abovementioned method.

DETAILED DESCRIPTION

In order to understand characteristics and technical contents in the embodiments of the present disclosure in more detail, the implementation of the embodiments of the disclosure is elaborated in combination with the accompanying drawings. The accompanying drawings are only used for reference, but not intended to limit the embodiments of the disclosure.

Embodiment 1

Figure 1:
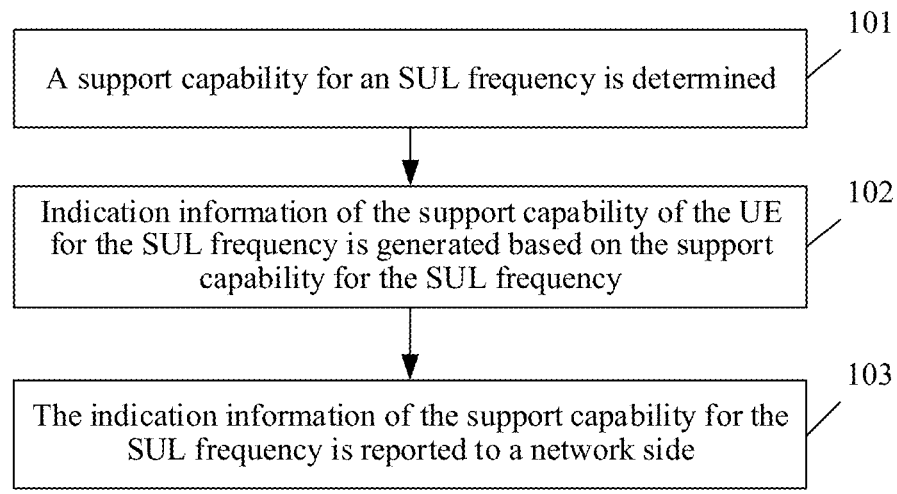
FIG. 1 is a flowchart of a method for reporting a capability, as provided by the embodiments of the disclosure.

The embodiment of the disclosure provides a method for reporting a capability, which is applied to UE, and as shown in FIG. 1, may include the following operations.

At operation 101, a support capability for an SUL frequency is determined.

At operation 102, indication information of the support capability of the UE for the SUL frequency is generated based on the support capability for the SUL frequency.

At operation 103, the indication information of the support capability for the SUL frequency is reported to a network side.

The embodiment may be divided into the following scenarios.

Scenario 1: Indication of SUL capability per UE.

Whether or not a SUL frequency is supported may be transmitted to a network side by UE. The indication information of the support capability may be indicated by different values at preset data bits; the values may be set according to an actual situation, for example, value=1 may indicate that the UE supports the SUL frequency, while value=0 may indicate that the UE does not support the SUL frequency. The network side may determine whether the UE supports the SUL frequency by identifying the values reported by different UE at the preset data bits.

Scenario 2: each UE indicates the support capability for the SUL frequency in a stand-alone (SA) deployment mode and in a non-stand-alone (NSA) deployment mode. Specific description is given below.

The support capability of the UE for the SUL frequency in each mode is determined among at least one mode.

The at least one mode at least may include: the SA deployment mode and the NSA deployment mode.

That is, two capabilities about SUL are respectively defined for the UE, and the capabilities are defined per UE. One capability about SUL is a SA SUL support capability, and the other capability about SUL is a NSA SUL support capability.

The indicating manner may be that: when a capability is reported, a preset field is set after an identifier of a mode, and different identifiers are used in the preset field to specify whether the SUL is supported in the mode; for example, a preset field is set after the identifier of the SA mode, and the identifier=1 may be used to specify that the SUL is supported in the SA mode, or else, the identifier=0 may specify that the SUL is not supported; and the manner is the same for the NSA mode and will not be repeated here.

Scenario 3:

At least one target band combination (BC) where the UE supports the SUL frequency is determined among at least one BC.

Optionally, a BC list may be defined for each SUL capability. In terms of the SUL capability support, only the SUL capability of the BC is supported.

Specifically, reporting the support capability for the BC may include the following two ways.

The operation that the indication information of the support capability of the UE for the SUL frequency is generated may include the following operations.

At least one target BC that supports the UE to use the SUL frequency is added, and a support indication is set for all the at least one target BC. That is, when the support indication is reported, a band list supporting the SUL is reported, and then it is indicated in an overall indication area of the list that the target BC supports the SUL.

Or, at least one target BC that supports the UE to use the SUL frequency is added, and the support indication is set for each target BC.

For example, at least one BC supporting the SUL may be selected from all the BCs obtained by the UE as the target BC, and then, the corresponding identifier may be set for each target BC, so as to identify that the target BC is the combination that supports the SUL frequency. The identifier may be obtained through mutual negotiation between the network and UE; for example, if both parties agree that identifier=1 may be used to indicate that the SUL frequency is supported, then support to the SUL frequency may be indicated by setting identifier=1 in each target BC.

That is, for the UE supports SUL in a BC in the BC list supported by the UE, an indication is added to the BC to represent that the SUL capability is supported in the BC, or else, the SUL capability is not supported in the BC.

Scenario 4:

The operation that the support capability for the SUL frequency is determined may include the following operation.

At least one target BC that supports the SUL frequency in each mode is determined for the UE among at least one mode.

The at least one mode at least may include: the SA mode and the NSA deployment mode.

The scenario can be considered as a combination of scenario 2 and scenario 3, that is, in different modes, the target BCs supporting the SUL can be determined respectively, and then, for different modes, the target BCs supporting the SUL in the corresponding modes can be respectively reported to the network side.

For example, in the SA deployment mode, target BCs supporting the SUL frequency may be (1, 5) and (2, 3), the two target BCs may be reported to the network side in the SA deployment mode, and then the situation that the two BCs can support the SUL frequency may be indicated through a unified identifier or through respective identifiers.

The manner for processing the NSA deployment mode is the same as the aforementioned manner, so elaborations are omitted herein.

By means of the above solutions, the network side may learn the capability of the UE through an indication, reported by the UE, about whether the SUL frequency is supported, so the network side can make a reasonable configuration for the UE based on the condition of the UE supporting the SUL frequency, thereby improving the processing efficiency of a system.

Embodiment 2

Figure 2:
FIG. 2 is a structure diagram of UE according to an embodiment of the disclosure.

The embodiment of the disclosure provides UE, as shown in FIG. 2, which may include a processing unit 21 and a communication unit 22.

The processing unit 21 is configured to determine a support capability for a SUL frequency, and generate, based on the support capability for the SUL frequency, the indication information of the support capability of the UE for the SUL frequency; and The communication unit 22 is configured to report the indication information of the support capability for the SUL frequency to a network side.

The embodiment may be divided into the following scenarios.

Scenario 1: Indication of SUL capability per UE.

Whether or not a SUL frequency is supported may be transmitted to a network side by UE. The indication information of the support capability may be indicated by different values at preset data bits; the values may be set according to an actual situation, for example, value=1 may indicate that the UE supports the SUL frequency, while value=0 may indicate that the UE does not support the SUL frequency. The network side may determine whether the UE supports the SUL frequency by identifying the values reported by different UE at the preset data bits.

Scenario 2: each UE indicates the support capability for the SUL frequency in a stand-alone (SA) deployment mode and in a non-stand-alone (NSA) deployment mode. Specific description is given below.

The processing unit 21 is configured to determine the support capability of the UE for the SUL frequency in each mode among at least one mode.

The at least one mode at least may include: the SA deployment mode and the NSA deployment mode.

That is, two capabilities about SUL are respectively defined for the UE, and the capabilities are defined per UE. One capability about SUL is a SA SUL support capability, and the other capability about SUL is a NSA SUL support capability.

The indicating manner may be that: when a capability is reported, a preset field is set after an identifier of a mode, and different identifiers are used in the preset field to specify whether the SUL is supported in the mode; for example, a preset field is set after the identifier of the SA mode, and the identifier=1 may be used to specify that the SUL is supported in the SA mode, or else, the identifier=0 may specify that the SUL is not supported; and the manner is the same for the NSA mode and will not be repeated here.

Scenario 3:

The processing unit 21 is configured to determine, among at least one BC, at least one target BC where the UE supports the SUL frequency.

Optionally, a BC list may be defined for each SUL capability. In terms of the SUL capability support, only the SUL capability of the BC is supported.

Specifically, reporting the support capability for the BC may include the following two ways.

The operation that the indication information of the support capability of the UE for the SUL frequency is generated based on the support capability for the SUL frequency may include the following operations.

At least one target BC that supports the UE to use the SUL frequency is added, and a support indication is set for all the at least one target BC. That is, when the support indication is reported, a band list supporting the SUL is reported, and then it is indicated in an overall indication area of the list that the target BC supports the SUL.

Or, at least one target BC that supports the UE to use the SUL frequency is added, and the support indication is set for each target BC.

For example, at least one BC supporting the SUL may be selected from all the BCs obtained by the UE as the target BC, and then, the corresponding identifier may be set for each target BC, so as to identify that the target BC is the combination that supports the SUL frequency. The identifier may be obtained through mutual negotiation between the network and UE; for example, if both parties agree that identifier=1 may be used to indicate that the SUL frequency is supported, then support to the SUL frequency may be indicated by setting identifier=1 in each target BC.

That is, for the UE supports SUL in a BC in the BC list supported by the UE, an indication is added to the BC to represent that the SUL capability is supported in the BC, or else, the SUL capability is not supported in the BC.

Scenario 4:

The processing unit 21 is configured to determine at least one target BC that supports the SUL frequency in each mode for the UE among at least one mode.

The at least one mode at least may include: the SA deployment mode and the NSA deployment mode.

The scenario can be considered as a combination of scenario 2 and scenario 3, that is, in different modes, the target BCs supporting the SUL can be determined respectively, and then, for different modes, the target BCs supporting the SUL in the corresponding modes can be respectively reported to the network side.

For example, in the SA deployment mode, target BCs supporting the SUL frequency may be (1, 5) and (2, 3), the two target BCs may be reported to the network side in the SA deployment mode, and then the situation that the two BCs can support the SUL frequency may be indicated through a unified identifier or through respective identifiers.

The manner for processing the NSA deployment mode is the same as the aforementioned manner, so elaborations are omitted herein.

Figure 3:
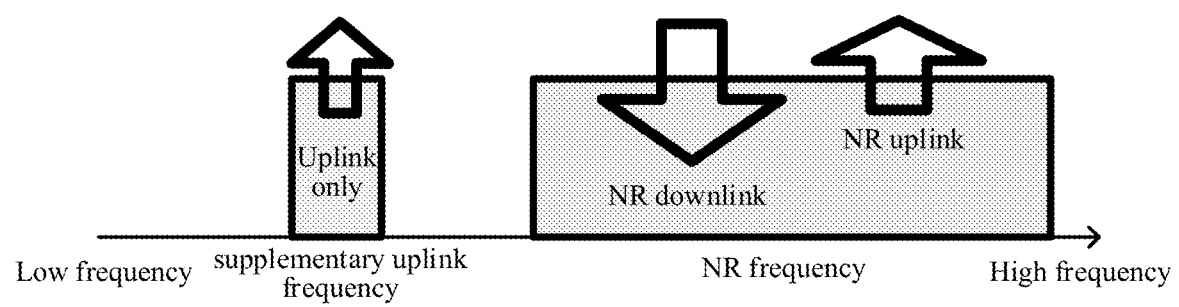
FIG. 3 is a schematic diagram of a system spectrum according to an embodiment of the disclosure.

A spectrum structure provided by the embodiment may be as shown in FIG. 3. The SUL frequency may be a lower frequency and only has part of the spectrum of an uplink frequency. The uplink frequency and downlink frequency of NR may be a higher frequency. The solution provided in the embodiments is to determine whether a SUI frequency on a left side of FIG. 3 is supported; and if so, the indication information may be reported to the network side.

Thus, by means of the above solutions, the network side may learn the capability of the UE through an indication, reported by the UE, about whether the SUL frequency is supported, so the network side can make a reasonable configuration for the UE based on the condition of the UE supporting the SUL frequency, thereby improving processing efficiency of a system.

Figure 4:
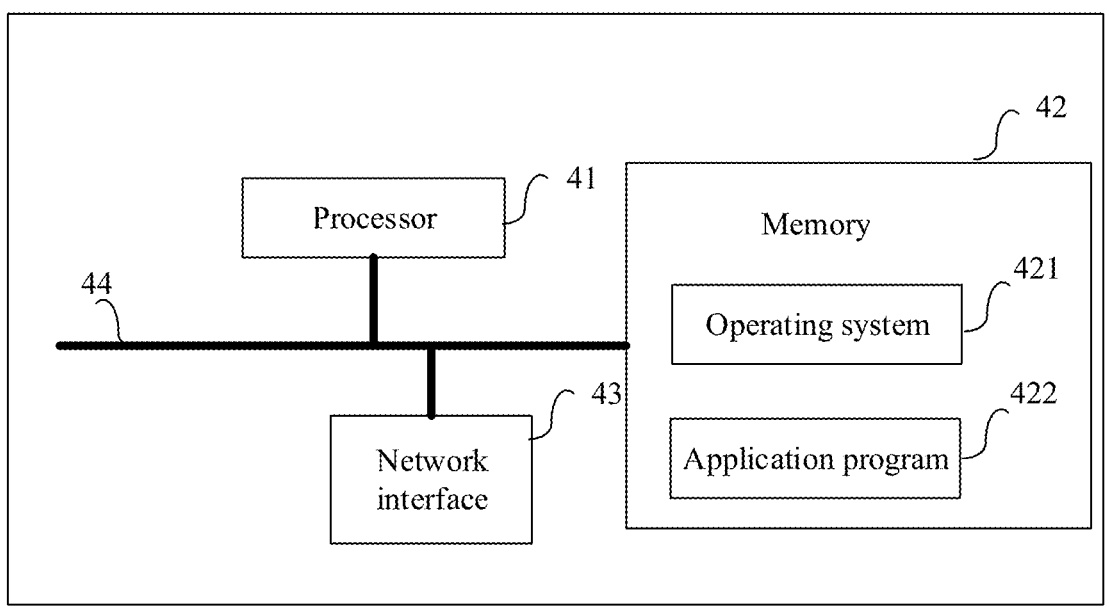
FIG. 4 is a schematic diagram of a hardware architecture according to an embodiment of the disclosure.

The embodiments of the disclosure also provide a hardware composition architecture of UE or a network device, which, as shown in FIG. 4, may include at least one processor 41, a memory 42 and at least one network interface 43. Each component may be coupled together through a bus system 44. It may be understood that the bus system 44 is configured to implement connection communication between these components. The bus system 44 may include a data bus and further may include a power bus, a control bus and a state signal bus. However, for clear description, various buses in FIG. 4 are marked as the bus system 44.

It may be understood that the memory 42 in the embodiment of the disclosure may be a volatile memory or a nonvolatile memory, or may include both the volatile and nonvolatile memories.

In some implementation modes, the memory 42 may have stored the following elements, executable modules or data structures, or a subset thereof or an extended set thereof:

an operating system 421 and an application program 422.

The processor 41 is configured to process the operations of the method in embodiment 1 or embodiment 2. The elaborations are omitted herein.

The embodiments of the disclosure provide a computer storage medium, which has stored computer-executable instructions, the computer-executable instructions being executed to implement the operations of the method of embodiment 1 or embodiment 2.

When being implemented in form of software functional modules and sold or used as an independent product, the device of the embodiments of the disclosure may also be stored in a computer-readable storage medium. Based on such an understanding, the technical solutions of the embodiments of the disclosure substantially or parts making contributions to the conventional art may be embodied in form of a software product, and the computer software product may be stored in a storage medium, including a plurality of instructions configured to enable a computer device (which may be a personal computer, a server, a network device or the like) to execute all or part of the method in each embodiment of the disclosure. The storage medium may include: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which a computer program is stored, the computer program being configured to execute the data scheduling method of the embodiments of the disclosure.

Although the preferred embodiments of the disclosure have been described for exemplary purposes, those skilled in the art may realize that it is also possible to make various improvements, additions and replacements. Therefore, the scope of the disclosure should not be limited to the above-mentioned embodiments.

The invention claimed is:

1. A method for reporting a capability, implemented by User Equipment (UE), the method comprising:
respectively determining a support capability of the UE for a supplementary uplink (SUL) frequency in a stand-alone (SA) deployment mode and a non-stand-alone (NSA) deployment mode;
generating indication information of the support capability of the UE for the SUL frequency based on the support capability for the SUL frequency; and
reporting the indication information of the support capability for the SUL frequency to a network side,
wherein generating the indication information of the support capability of the UE for the SUL frequency based on the support capability for the SUL frequency comprises:
adding at least one target band combination (BC), among one or more BCs, that supports the UE to use the SUL frequency only, and
setting one support indication for both the SA deployment mode and the NSA deployment mode.

2. The method of claim 1, wherein the one or more BCs include a BC that supports a new radio (NR) frequency.

3. The method of claim 1, wherein determining the support capability for the SUL frequency comprises:
   determining, for the UE, the at least one target BC that supports the SUL frequency only in the SA deployment mode and the NSA deployment mode.

4. User Equipment (UE), comprising:
   a processor; and
   a network interface, connected with the processor and configured to send and receive information;
   wherein the processor is configured to respectively determine a support capability of the UE for a supplementary uplink (SUL) frequency in a stand-alone (SA) deployment mode and a non-stand-alone (NSA) deployment mode, and the processor is configured to generate, based on the support capability for the SUL frequency, indication information of the support capability of the UE for the SUL frequency; and
   wherein the network interface is configured to report the indication information of the support capability for the SUL frequency to a network side, wherein the processor is further configured to
   add at least one target band combination, among one or more BCs, that supports the UE to use the SUL frequency only, and
   set one support indication for both the SA deployment mode and the NSA deployment mode.

5. The UE of claim 4, wherein the one or more BCs include a BC that supports a new radio (NR) frequency.

6. The UE of claim 4, wherein the processor is further configured to determine, for the UE, the at least one target BC that supports the SUL frequency only in the SA deployment mode and the NSA deployment mode.

7. User Equipment (UE), comprising: a processor and a memory configured to store a computer program capable of running in the processor;
   wherein the processor is configured to run the computer program to implement operations of:
   respectively determining a support capability of the UE for a supplementary uplink (SUL) frequency in a stand-alone (SA) deployment mode and a non-stand-alone (NSA) deployment mode;
   generating indication information of the support capability of the UE for the SUL frequency based on the support capability for the SUL frequency; and
   reporting the indication information of the support capability for the SUL frequency to a network side,
   wherein the processor is further configured to
   add at least one target band combination (BC), among one or more BCs, that supports the UE to use the SUL frequency only, and
   set one support indication for both the SA deployment mode and the NSA deployment mode.

8. The UE of claim 7, wherein the one or more BCs include a BC that supports a new radio (NR) frequency.

9. A non-transitory computer storage medium, having stored computer-executable instructions thereon, wherein the computer-executable instructions are executed to implement operations of the method of claim 1.

* * * * *